(12) United States Patent
Koshimizu et al.

(10) Patent No.: US 9,860,832 B2
(45) Date of Patent: Jan. 2, 2018

(54) M2M PLATFORM APPARATUS AND COMMUNICATION SERVICE EXECUTION METHOD

(71) Applicant: NTT DOCOMO, INC., Tokyo (JP)

(72) Inventors: Takashi Koshimizu, Tokyo (JP); Keisuke Sasada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 157 days.

(21) Appl. No.: 14/893,565

(22) PCT Filed: May 15, 2014

(86) PCT No.: PCT/JP2014/062907
§ 371 (c)(1),
(2) Date: Nov. 24, 2015

(87) PCT Pub. No.: WO2014/192549
PCT Pub. Date: Dec. 4, 2014

(65) Prior Publication Data
US 2016/0105845 A1    Apr. 14, 2016

(30) Foreign Application Priority Data
May 30, 2013  (JP) ................ 2013-114490

(51) Int. Cl.
 *H04W 48/18*  (2009.01)
 *H04W 4/00*   (2009.01)
 *G06F 17/30*  (2006.01)

(52) U.S. Cl.
 CPC ...... *H04W 48/18* (2013.01); *G06F 17/30082* (2013.01); *G06F 17/30312* (2013.01); *H04W 4/005* (2013.01)

(58) Field of Classification Search
 CPC ... H04W 48/18; H04W 4/00; G06F 17/30082; G06F 17/30312
 See application file for complete search history.

(56) References Cited

U.S. PATENT DOCUMENTS 8,862,551 B2 * 10/2014 Lim ............ G06F 21/6218
                                                707/648
9,497,070 B2 * 11/2016 Mungo ............. H04L 41/028
(Continued)

FOREIGN PATENT DOCUMENTS

WO    2012/160813 A1    11/2012

OTHER PUBLICATIONS

International Search Report issued in PCT/JP2014/062907 dated Aug. 19, 2014 (2 pages).
(Continued)

*Primary Examiner* — Min Jung
(74) *Attorney, Agent, or Firm* — Osha Liang LLP

(57) ABSTRACT

An M2M platform apparatus 100 includes: data repositories 230, 240 configured to store data transmitted from M2M devices 20A, 20B; a data format processing unit 210 configured to determine in which format to store the data into the data repositories; a data analysis proposal unit 220 configured to analyze the stored data and, based on the data, propose the content of a service to be executed; a service execution-start unit 360 configured to request control on the M2M devices or communication equipment based on the content of the service proposed; and a rule-policy management unit 320 configured to cause the data to be stored into the data repositories based on a rule or a policy for the handling of the data to be stored into the data repositories.

4 Claims, 4 Drawing Sheets

(56) References Cited

U.S. PATENT DOCUMENTS

| | | | |
|---|---|---|---|
| 2014/0089342 A1 | 3/2014 | Takayanagi et al. | |
| 2014/0143395 A1* | 5/2014 | Geltner | H04L 41/0893 709/223 |
| 2015/0256962 A1* | 9/2015 | Yang | H04W 88/16 370/329 |

OTHER PUBLICATIONS

Written Opinion of the International Searching Authority issued in PCT/JP2014/062907 dated Aug. 19, 2014 (3 pages).

3GPP TS 22.368 V12 2.0; "3rd Generation Partnership Project; Technical Specification Group Services and System Aspects; Service requirements for Machine-Type Communications (MTC); Stage 1 (Release 12)", Mar. 2013 (24 pages).

NEC Corporation (TTC) et al.; "Use Case on optimized M2M interworking with mobile networks (Optimizing mobility management parameters)", oneM2M-REQ-2013-0137R02-Use_Case_on_Mobile_Network_interworking-mobility.doc, Apr. 15, 2013 (9 pages).

OneM2MPartners; "Use Case TR"; oneM2M-REQ-2012-0065R010-Use_Case_TR; Apr. 13, 2013 (105 pages).

DTAG, Vodafone Group; "An Operatiors Input for oneM2M Baseline"; oneM2M-REQ-2012-0070R1; Dec. 10, 2012 (15 pages).

Yoshihito Nakayama.; "An IT strategy to produce profit: System infrastructure accelerates business"; Nikkei BP Consulting, Inc., 1st edition; Oct. 29, 2012 (39 pages).

Kunihiko Shimizu; "Using OSS for M2M Cloud by NTT DATA"; Business Communication Co. Ltd., vol. 49, No. 10; Oct. 1, 2012 (15 pages).

Hideyuki Kawamura; "ICT Technology for Smart Grid: Approach to ICT Platform Development for Public Infrastructures"; The Publishing Taiga Shuppan Co. Ltd., vol. 53, No. 15, Oct. 15, 2012 (17 pages).

* cited by examiner

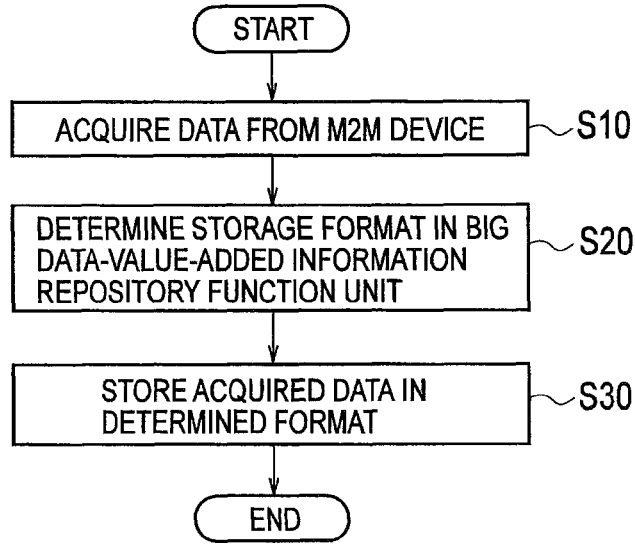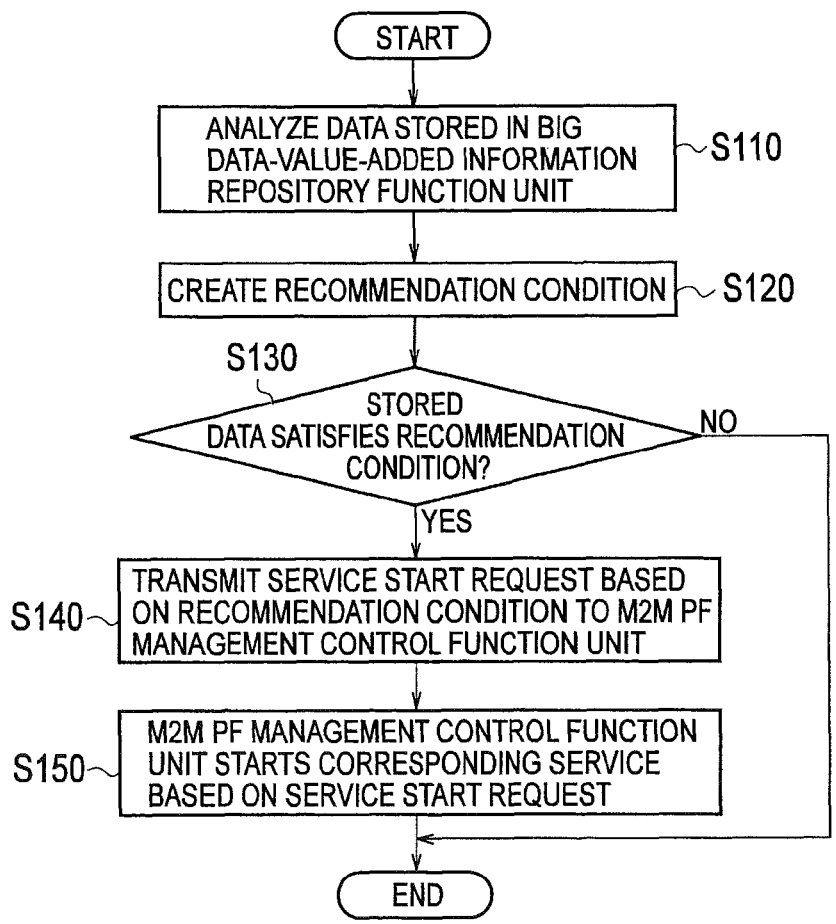

M2M PLATFORM APPARATUS AND COMMUNICATION SERVICE EXECUTION METHOD

TECHNICAL FIELD

The present invention relates to an M2M platform apparatus and a communication service execution method for storing data transmitted from a machine through a communication network and providing an environment for executing a service based on the data.

BACKGROUND ART

In recent years, consideration of M2M (Machine-to-Machine), i.e. inter-machine communication has been in progress in which machines connected to a communication network communicate with each other without intervention of human operation and automatically execute appropriate machine control and the like. For example, in the 3rd Generation Partnership Project (3GPP), standardization of M2M communication standards has been in progress with the term Machine Type Communication (MTC) (e.g. Non-patent Document 1).

Also, in oneM2M (http://www.onem2 m.org/), consideration of M2M use cases, requirements for M2M platforms (M2M-PF), and the like have been in progress. For example, there has been a proposal in which an M2M platform monitors mobility characteristics (such as a moving or stopped state) of each mobile object (machine) such as a commercial vehicle, a truck, or a taxi and changes the range of a paging area for the mobile object based on the monitored mobility characteristics to thereby optimize the number of times a paging signal is transmitted and the intensity thereof in an attempt to reduce the amount of paging signals (e.g. Non-patent Document 2).

PRIOR ART DOCUMENTS

Non-Patent Documents

Non-patent Document 1: 3GPP TS 22.368 V12.2.0 Technical Specification Group Services and System Aspects; Service requirements for Machine-Type Communications (MTC); Stage 1 (Release 12), 3GPP, March 2013

Non-patent Document 2: oneM2M-REQ-2013-0137R02, "Use Case on optimized M2M interworking with mobile networks", NEC, April 2013

SUMMARY OF THE INVENTION

Problem to be Solved by the Invention

Here, M2M platforms mentioned in the above prior art documents are only conceptually described, and functions to be arranged at each layer, specific architectures, and the like are yet to be clarified. An M2M platform is required to have functions such as a function to efficiently store an enormous amount of data outputted from a large number of machines with a communication function, and a function to optimize services such as machine control utilizing the stored data.

The present invention has been made in view of such circumstances, and an objective thereof is to provide an M2M platform apparatus and a communication service execution method which, by effectively utilizing data generated by M2M communication, can execute an optimal service based on the data in an appropriate manner as needed.

Means for Solving the Problem

A first feature of the present invention is summarized as an M2M platform apparatus for storing data transmitted through a communication network from an M2M device configured to perform inter-machine communication, and providing an environment for executing a service based on the data, the M2M platform apparatus including: a data repository configured to store the data transmitted from the M2M device through the communication network; a data format processing unit configured to determine in which format to store the data into the data repository; a data analysis proposal unit configured to analyze the data stored in the data repository and, based on the data, propose a content of a service to be executed; a service execution unit configured to request control on the M2M device or communication equipment, each of which is connected through the communication network, based on the content of the service proposed by the data analysis proposal unit; and a rule-policy management unit configured to cause the data to be stored into the data repository based on a rule or a policy for handling of the data to be stored into the data repository.

A communication service execution method to be performed in a server apparatus for storing data transmitted through a communication network from an M2M device configured to perform inter-machine communication, and providing an environment for executing a service based on the data, the communication service execution method including the steps of: storing the data transmitted from the M2M device through the communication network into a data repository; determining in which format to store the data into the data repository; analyzing the data stored in the data repository and, based on the data, proposing a content of a service to be executed; requesting control on the M2M device or communication equipment, each of which is connected through the communication network, based on the content of the service proposed; and causing the data to be stored into the data repository based on a rule or a policy for handling of the data to be stored into the data repository.

BRIEF DESCRIPTION OF THE DRAWINGS

FIG. 3 is a diagram showing an operation flow in the acquisition and storage of data from M2M devices according to the embodiment of the present invention.

FIG. 4 is a diagram showing an operation flow in the starting of a service based on stored data in a data repository according to the embodiment of the present invention.

MODES FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Schematic Overall Configuration of Information Communication System

Figure 1:
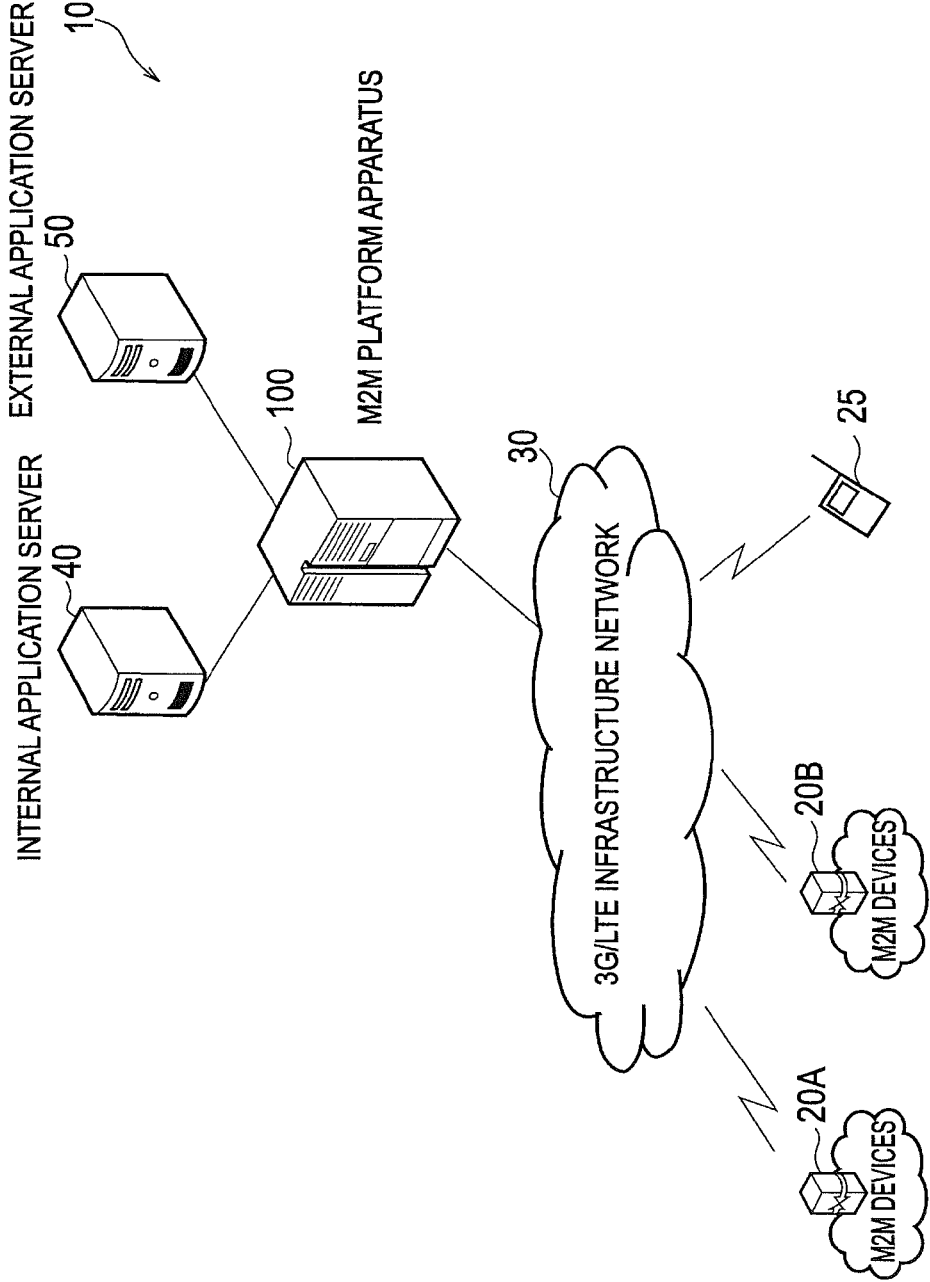
FIG. 1 is a schematic overall configurational view of an information communication system 10 according to an embodiment of the present invention.

FIG. 1 is a schematic overall configurational view of an information communication system 10 according to this embodiment. As shown in FIG. 1, the information communication system 10 includes M2M devices 20A, 20B, user equipment 25, a 3G/LTE infrastructure network 30, an internal application server 40, an external application server 50, and an M2M application middle layer platform apparatus 100.

The information communication system 10 implements M2M (Machine-to-Machine) in which the M2M devices 20A, 20B connected to the 3G/LTE infrastructure network 30 (communication network) communicate with each other without intervention of human operation to allow automatic appropriate control of the M2M devices 20A, 20B, automatic provision of information to the user equipment 25 or other components, and the like.

The M2M devices 20A, 20B are devices having a communication function for performing inter-machine communication and, in this embodiment, wirelessly connectable to the 3G/LTE infrastructure network 30. Typical examples of the M2M devices 20A, 20B may include communication modules installed on machines (e.g. vehicles, vending machines, and electricity meters) and terminal equipment such as mobile phones.

Note that although only the M2M devices 20A, 20B are illustrated in FIG. 1, a large number of M2M devices can be connected to the 3G/LTE infrastructure network 30 in actual practice. It is also possible to employ a configuration in which a concentrator (M2M-Gateway) configured to bundle a plurality of M2M devices is placed and the M2M devices are connected to the 3G/LTE infrastructure network 30 through the concentrator.

The user equipment 25 (UE) is communication equipment connectable to the 3G/LTE infrastructure network 30. Examples of the user equipment 25 may include a mobile phone, a smartphone, a tablet, and the like.

The 3G/LTE infrastructure network 30 is a mobile communication network complying with 3G or Long Term Evolution (LTE) technical standards specified by the 3rd Generation Partnership Project (3GPP).

The internal application server 40 and the external application server 50 are connected to the M2M application middle layer platform apparatus 100. The internal application server 40 and the external application server 50 are capable of communicating with the M2M devices 20A, 20B through the 3G/LTE infrastructure network 30 and the M2M application middle layer platform apparatus 100.

The internal application server 40 is a server on which application programs are executed that are operated by the operating entity of the M2M application middle layer platform apparatus 100, for example, the operator of the 3G/LTE infrastructure network 30. Also, the external application server 50 is a server on which application programs are executed that are owned by external entities other than the operating entity of the M2M application middle layer platform apparatus 100, for example, an electric power company that collects data outputted by M2M devices installed on electricity meters.

The M2M application middle layer platform apparatus 100 is configured to store data transmitted from the M2M devices 20A, 20B through the 3G/LTE infrastructure network 30 and provide an environment for executing services based on the data. This embodiment assumes that the M2M application middle layer platform apparatus 100 is operated and managed by the operator of the 3G/LTE infrastructure network 30. However, the operation and management of the M2M application middle layer platform apparatus 100 are not necessarily have to be done by the operator of the 3G/LTE infrastructure network 30.

The M2M application middle layer platform apparatus 100 provides a function to optimize services utilizing the data transmitted from the M2M devices 20A, 20B and the like while satisfying requirements for M2M platforms (M2M-PF) considered by oneM2M (http://www.onem2m.org/).

(2) Configuration of M2M Platform Apparatus

Figure 2:
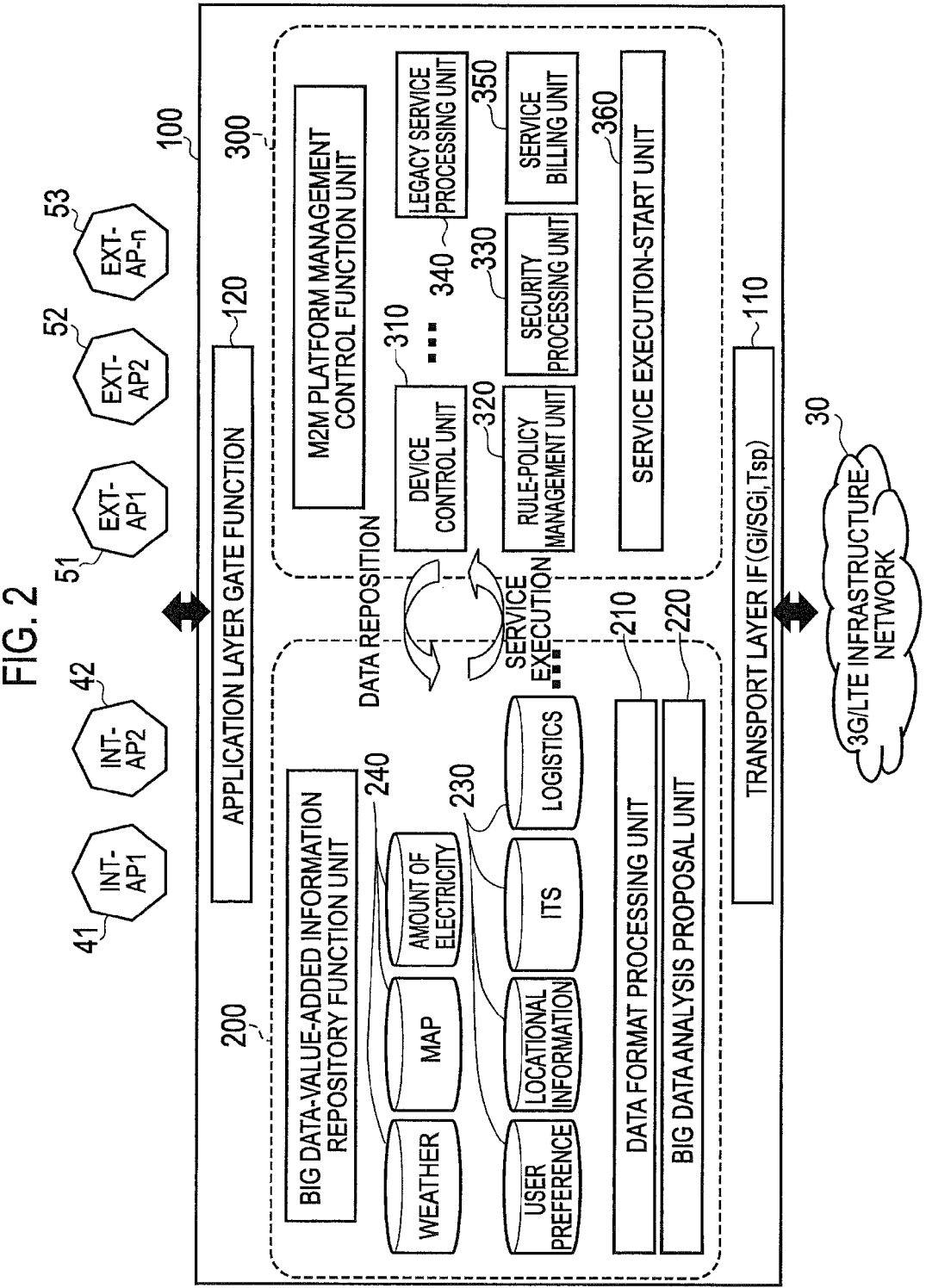
FIG. 2 is a functional block diagram of an M2M application middle layer platform apparatus 100 according to the embodiment of the present invention.

FIG. 2 is a functional block diagram of the M2M application middle layer platform apparatus 100. As shown in FIG. 2, the M2M application middle layer platform apparatus 100 includes a transport layer interface 110, an application layer gate function 120, a big data-value-added information repository function unit 200, and an M2M platform management control function unit 300.

The transport layer interface 110 is an interface for an infrastructure layer (3G/LTE infrastructure network 30 that provides connectivity to the M2M platform (big data-value-added information repository function unit 200 and M2M platform management control function unit 300). It is Gi/SGi and Tsp, which are interfaces for Packet Data Network (PDN), in a case where the system complies with 3GPP MTC specifications (e.g. 3GPP TR 23.682 v11.1.0 Architecture Enhancements to facilitate communications with packet data network and applications R11, Stage 2, June 2012). Note that Gi/SGi is a U-Plane IF, and Tsp is a C-Plane IF.

The transport layer interface 110 has abilities such as an ability to present the M2M platform in a unified manner to a lower infrastructure layer, an ability to abstract various functions of the M2M platform and present only the necessary functions, and an ability to execute authentication on and use the infrastructure layer.

The application layer gate function 120 is an interface between the M2M platform and an application layer. It has abilities such as an ability to present the M2M platform in a unified manner to internal applications 41, 42 and external applications 51 to 53, and an ability to bundle interfaces for many application programs.

The application layer gate function 120 also has a function to subject the external applications 51 to 53 to AAA authentication inside the M2M platform in a case where the external applications 51 to 53 are to utilize the M2M platform, and permit access to the M2M platform only for the authenticated application programs. The application layer gate function 120 further has a function to subject the M2M platform side to authentication as gating with the M2M platform in a case where the M2M platform is to start a specific application program.

The internal applications 41, 42 are application programs implemented in the internal application server 40 and managed by the operating entity of the M2M application middle layer platform apparatus 100 (in this embodiment, the operator of the 3G/LTE infrastructure network 30). Examples of these application programs may include application programs related to the locational information on the M2M devices 20A, 20B, an intelligent transportation system (ITS), and logistics (e.g. services executable with data which the operator owning the 3G/LTE infrastructure network 30 and the M2M application middle layer platform apparatus 100 can collect itself, more specifically, a customer (user) movement history checking service and the like).

The external applications 51 to 53 are application programs implemented in the external application server 50 and managed by external entities other than the operating entity of the M2M application middle layer platform apparatus 100. Examples of these application programs may include application programs related to weather information and maps, application programs to be utilized by an electric power company that, as mentioned earlier, collects data outputted by M2M devices installed on electricity meters, and the like.

The M2M application middle layer platform apparatus 100 is capable of executing or starting services which the 3G/LTE infrastructure network 30 has, based on data stored in the big data-value-added information repository function unit 200 (the direction of the arrow "SERVICE EXECUTION" in FIG. 2).

The fundamental function of the M2M application middle layer platform apparatus 100 is to gradually develop its big data part with communication performed through a conventional infrastructure network that provides connectivity (the direction of the arrow "DATA REPOSITION" in FIG. 2). The big data part is gradually developed in this manner so that more accurate recommendations can be made and applications utilizing the big data can be progressively developed.

In the M2M application middle layer platform apparatus 100, the "SERVICE EXECUTION" mentioned above, i.e., control from the big data-value-added information repository function unit 200 to the M2M platform management control function unit 300, and the data reposition from the M2M platform management control function unit 300 to the big data-value-added information repository function unit 200 repeatedly act as if the two side of the same coin. Specifically, communication related to the M2M devices 20A, 20B develops the big data stored in the big data-value-added information repository function unit 200 and, based on meaningful data generated as a result thereof, new services or optimized services by the 3G/LTE infrastructure network 30 can be executed or started.

As mentioned above, the M2M application middle layer platform apparatus 100 broadly includes the big data-value-added information repository function unit 200 and the M2M platform management control function unit 300.

The types of data (information) stored in the big data-value-added information repository function unit 200 include information which the operating entity of the M2M application middle layer platform apparatus 100 can collect itself, information which the operating entity purchases from other entities, information which the operating entity constructs in cooperation with other entities, and the like. More useful and valuable big data can be constructed by taking information related to other entities into the big data-value-added information repository function unit 200 as described above. Consequently, more accurate recommendations can be made.

The M2M platform management control function unit 300 is configured to execute or start services provided by the 3G/LTE infrastructure network 30, in cooperation with the big data-value-added information repository function unit 200. The M2M platform management control function unit 300 also provides functions related to security and billing which are necessary in the execution of these services. The M2M platform management control function unit 300 has a non-hierarchical structure and is configured to be flexible to new M2M use cases.

Description will now be given below of details of the functional block configurations of the big data-value-added information repository function unit 200 and the M2M platform management control function unit 300.

(2.1) Big Data-Value-Added Information Repository Function Unit 200

As shown in FIG. 2, the big data-value-added information repository function unit 200 includes a data format processing unit 210, a big data analysis proposal unit 220, an internal data repository 230, and an external data repository 240.

The data format processing unit 210 is configured to determine in which format to store data into the data repository, specifically, the internal data repository 230 or the external data repository 240. Specifically, the data format processing unit 210 has a function to convert the data transmitted by the M2M devices 20A, 20B into desirable formats or into a unified format when the data are taken and stored into the data repository. With this data adaptation performed by the data format processing unit 210, the formats of the data stored in the data repository are unified.

The big data analysis proposal unit 220 is configured to analyze data stored in the data repository (internal data repository 230 or external data repository 240) and, based on the data, propose the content of a service to be executed. Specifically, the big data analysis proposal unit 220 extracts meaningful information from the big data stored in the data repository, analyzes it, and proposes the content of a service which the 2M platform management control function unit 300 should be instructed to execute (the arrow of "SERVICE EXECUTION" in FIG. 2).

The big data analysis proposal unit 220 is further configured to instruct the M2M platform management control function unit 300 based on the result of this data analysis to start a service which can be provided by the 3G/LTE infrastructure network 30.

The internal data repository 230 and the external data repository 240 are configured to store the data transmitted from the M2M devices 20A, 20B through the 3G/LTE infrastructure network 30.

The internal data repository 230 includes a group of data (information) which the operating entity of the M2M application middle layer platform apparatus 100 can collect itself and store, and the like. As shown in FIG. 2, examples of this group of data may include the preference of the users of the 3G/LTE infrastructure network 30 in terms of communication (user preference), the locational information on the users (mobile communication terminals), information from an intelligent transportation system (ITS) (such as traffic congestion information and regulatory information), information from a logistics system (information which the operator can collect itself, the frequency of communication, the location of communication, the number of terminals, the locational information on the users), and the like.

The external data repository 240 includes a group of data (information) which the operating entity of the M2M application middle layer platform apparatus 100 purchases from other entities and develops in cooperation with other entities. As shown in FIG. 2, examples of this group of data may include, as mentioned above, weather information, information related to maps, information on electricity amounts outputted by M2M devices installed on electricity meters, and the like. In consideration of its possible future expansion, the external data repository 240 is configured such that the database variations can be additionally increased.

(2.2) M2M Platform Management Control Function Unit 300

As shown in FIG. 2, the M2M platform management control function unit 300 includes a device control unit 310, a rule-policy management unit 320, a security processing unit 330, a legacy service processing unit 340, a service billing unit 350, and a service execution-start unit 360.

The device control unit 310 is configured to control the M2M devices 20A, 20B. Specifically, the device control unit 310 recognizes allowance or disallowance of communication with the M2M devices 20A, 20B and the presence or absence of connectivity.

The rule-policy management unit 320 is configured to manage rules or policies for the handling of data to be stored into the data repository (internal data repository 230 or external data repository 240). The rule-policy management unit 320 is also configured to cause the data transmitted from the M2M devices 20A, 20B to be stored into the data repository based on the rules or policies for the handling of the data to be stored into the data repository (see the arrow of "DATA REPOSITION" in FIG. 2).

More specifically, the rule-policy management unit 320 holds rules or policies for the handling of data related to the external applications 51 to 53 utilized by the external entities other than the operating entity of the M2M application middle layer platform apparatus 100, and causes data that satisfy the held rules or policies to be stored into the data repository. That is, the data transmitted by the M2M devices 20A, 20B toward the external applications 51 to 53 sometimes contain data that can be utilized and data that cannot be utilized due to arrangements with the entities (such as companies) that manage the external applications and agreements with these entities, and rules or policies are therefore needed for the data utilization in this situation.

Note that a rule represents the content of a specific arrangement for the utilization of the corresponding data, while a policy is a higher-level concept than the rule and represents a course of utilization of the data. For example, a rule specifically identifies the M2M devices or communication equipment for which to execute the service proposed by the big data analysis proposal unit 220 based on the result of analysis on the corresponding data, while a policy determines whether to allow or disallow the data utilization in accordance with the data type and specifies the type of the control-target M2M devices or communication equipment.

The security processing unit 330 provides functions for entire security processing that is necessary in the M2M platform. Specifically, the security processing unit 330 executes service level authentication, application level authentication, access authentication to a profile and the data repository, and the like which are necessary to start an application related to a specific service. The security processing unit 330 also executes functions such as a function to subject the internal applications 41, 42, the external applications 51 to 53, or the like to authentication or a confidentiality process when these applications utilize the M2M application middle layer platform apparatus 100, and a function to cause the M2M application middle layer platform apparatus 100 to subject the 3G/LTE infrastructure network 30 to authentication when the 3G/LTE infrastructure network 30 utilizes a function inside the M2M application middle layer platform apparatus 100.

The legacy service processing unit 340 provides functions necessary to start legacy services, specifically, services of the infrastructure layer (such as a short message service (SMS), voice call, and data communication). More specifically, the legacy service processing unit 340 provides functions to start services situated at higher to lower levels than the transport layer interface 110 (Gi/SGi).

For example, data from a M2M device that transmits data on a patient's pulse rate is analyzed and, when the pulse rate reaches or exceeds a preset value, the legacy service processing unit 340 starts a process of transmitting an SMS message indicating that the patient's pulse rate has reached or exceeded the preset value to particular communication equipment (e.g. the doctor's user equipment 25). Note that specific examples as above will be further described later.

The service billing unit 350 provides general functions related to billing involved in the utilization of the M2M application middle layer platform apparatus 100.

The service execution-start unit 360 is configured to request control on the M2M devices or the user equipment 25 connected through the 3G/LTE infrastructure network 30, based on the service execution instruction from the big data-value-added information repository function unit 200. Specifically, based on the content of the service proposed by the big data analysis proposal unit 220, the service execution-start unit 360 requests the device control unit 310 and the legacy service processing unit 340 to control the corresponding M2M devices or the user equipment 25. Also, based on the content of the service, the service execution-start unit 360 requests the service billing unit 350 to perform a billing process.

Note that as mentioned above, the M2M platform management control function unit 300 includes the device control unit 310, the rule-policy management unit 320, the security processing unit 330, the legacy service processing unit 340, the service billing unit 350, and the service execution-start unit 360. While these are the main functions, new functional blocks may be added later when new services are devised. Even in this case, new functional blocks can be easily added to the M2M application middle layer platform apparatus 100. Thus, the M2M platform can be progressively developed.

(3) Operation of M2M Platform Apparatus

The operation of the M2M application middle layer platform apparatus 100 will now be described. Specifically, description will be given of operations in (3.1) acquisition and storage of data from M2M devices, (3.2) starting of a service based on stored data, and (3.3) storage of data in compliance with rules or policies.

(3.1) Acquisition and Storage of Data from M2M Devices

FIG. 3 shows an operation flow in the acquisition and storage of data from the M2M devices. As shown in FIG. 3, the M2M application middle layer platform apparatus 100 acquires the data transmitted from the M2M devices 20A, 20B (S10). Specifically, the M2M application middle layer platform apparatus 100 acquires the data transmitted from the M2M devices 20A, 20B to the internal application server 40 or the external application server 50 through the 3G/LTE infrastructure network 30.

The M2M application middle layer platform apparatus 100 determines in which format to store the data into the big data-value-added information repository function unit 200 (S20). Specifically, the M2M application middle layer platform apparatus 100 determines in which format to store the data into the internal data repository 230 or the external data repository 240 under the assumption that data formats differing by application should be converted into a unified format so that data can be easily analyzed and semantic data can be easily found.

The M2M application middle layer platform apparatus 100 stores the data acquired in Step S10 into the internal data repository 230 or the external data repository 240 in the determined storage format (S30).

By repeating the operations in Steps S10 to S30, the M2M application middle layer platform apparatus 100 constructs more useful and valuable big data.

(3.2) Starting of Service Based on Stored Data

FIG. 4 shows an operation flow in the starting of a service based on stored data. As shown in FIG. 4, the M2M application middle layer platform apparatus 100 analyzes data stored in the big data-value-added information repository function unit 200 (S110). Specifically, the M2M application middle layer platform apparatus 100 analyzes data stored in the internal data repository 230 or the external data repository 240 and determines the presence or absence of a recommendation to any M2M device or the user equipment 25 connected to the 3G/LTE infrastructure network 30.

The M2M application middle layer platform apparatus 100 creates a recommendation condition to the M2M device or the user equipment 25 based on the result of the analysis on the data stored in the internal data repository 230 or the external data repository 240 (S120).

For example, the M2M application middle layer platform apparatus 100 can analyze data from an M2M device that transmits data on a patient's pulse rate and, when the pulse rate reaches or exceeds a preset value, transmit an SMS (recommendation) message indicating that the patient's pulse rate has reached or exceeded the preset value to particular communication equipment (e.g. the doctor's user equipment 25). Alternatively, the M2M application middle layer platform apparatus 100 can introduce (recommend) an optimal route to a destination taking the weather into consideration, based on the ITS information stored in the internal data repository 230 and the weather and map information stored in the external data repository 240.

Based on the recommendation condition thus created, the M2M application middle layer platform apparatus 100 determines whether or not the data stored in the internal data repository 230 or the external data repository 240 satisfies the recommendation condition (S130).

If the stored data satisfies the recommendation condition, the M2M application middle layer platform apparatus 100, specifically, the big data analysis proposal unit 220 included in the big data-value-added information repository function unit 200 transmits a service start (execution) request based on the recommendation condition to the M2M platform management control function unit 300 (S140).

The M2M platform management control function unit 300, specifically, the service execution-start unit 360 starts the corresponding service based on the service start request transmitted from the big data-value-added information repository function unit 200 (S150).

For example, the service execution-start unit 360 can request the legacy service processing unit 340 to transmit an SMS message indicating that the patient's pulse rate has reached or exceeded the preset value or instruct a lower layer to cause particular medical equipment to automatically operate in cooperation with the device control unit 310.

(3.3) Storage of Data in Compliance with Rules or Policies

Figure 5:
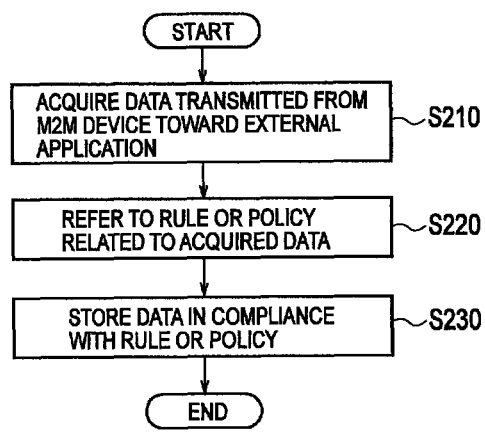
FIG. 5 is a diagram showing an operation flow in the storage of data in compliance with rules or policies according to the embodiment of the present invention.

FIG. 5 shows an operation flow in the storage of data in compliance with rules or policies. As shown in FIG. 5, the M2M application middle layer platform apparatus 100 acquires the data transmitted from the M2M devices 20A, 20B toward the external application server 50 (external application 51 to 53) (S210). Examples of the data transmitted toward the external application may include data indicating the amount of electricity used and transmitted to an application program utilized by an electric power company that collects data outputted from M2M devices installed on electricity meters, as mentioned above, and the like.

The M2M application middle layer platform apparatus 100 refers to the rules or policies for the storage and utilization of the acquired data (S220). Specifically, the M2M application middle layer platform apparatus 100 determines, for example, the method of storing the data by referring the rules or policies for the storage and utilization of the data which are managed by the rule-policy management unit 320.

For example, in the case of the data mentioned above indicating the amount of electricity used, the method of storing the data is determined based on rules or policies such as not storing the specific location where the M2M device having transmitted the data is installed (its address or longitude-latitude information) but storing information on the area where the M2M device is installed (such as its city), and not storing the specific amount of electricity used but storing information indicating whether the amount of electricity used is large or small.

The M2M application middle layer platform apparatus 100 stores the data acquired in Step S210 into the external data repository 240 in accordance with the data storage method determined in accordance with the rules or policies for the storage and utilization of the data which are managed by the rule-policy management unit 320 (S230).

Note that in the case of the data mentioned above indicating the amount of electricity used, semantic data such as a region (special) or temporal distribution of power consumption can be extracted by analyzing the data that is in compliance with the rules or policies. In this way, a recommendation condition based on the semantic data (e.g. transmitting a message recommending energy saving during a certain time period) or the like can be created.

(4) Advantageous Effects

As mentioned above, the M2M application middle layer platform apparatus 100 includes: the data repositories (internal data repository 230 and external data repository 240) configured to store data transmitted from the M2M devices 20A, 20B through the 3G/LTE infrastructure network 30; the data format processing unit 210 configured to determine in which format to store the data into the data repositories; the big data analysis proposal unit 220 configured to analyze the data stored in the data repositories and, based on the data, propose the content of a service to be executed; the service execution-start unit 360 configured to request control on the M2M devices or the user equipment 25, based on the content of the service proposed; and the rule-policy management unit 320 configured to cause the data to be stored into the data repositories based on rules or policies for the handling of the data to be stored into the data repositories.

According to this configuration, big data that can potentially be a future source of profit for the operating entity of the M2M application middle layer platform apparatus 100 can be constructed and progressively developed via the connectivity to the 3G/LTE infrastructure network 30. Moreover, according to the configuration, the operating entity of the M2M application middle layer platform apparatus 100 can provide a value creation service from the profit structure that is based on the provision of the connectivity. This can contribute to creation of more accurate recommending services as well as new services and markets based on information the operating entity collects and analyzes itself. In sum, by effectively utilizing data generated by M2M communication, the application middle layer platform apparatus 100 can timely execute an optimal service based on the data.

Note that it is difficult to instantly build a solid M2M platform and big data, for which reason the M2M application middle layer platform apparatus 100 is configured to be capable of gradually developing an M2M platform and big data step by step. Specifically, the M2M application middle layer platform apparatus 100 is configured such that services which can be initiated early can be implemented early, and is considered such that big data can be progressively developed by gradually taking in data managed by other entities (such as companies) and the like.

In this embodiment, the M2M application middle layer platform apparatus 100 is functionally separated completely from the 3G/LTE infrastructure network 30 by the transport layer interface 110. Hence, an M2M platform architecture with no overlap with the 3G/LTE function can be easily realized. Further, in this embodiment, the M2M application middle layer platform apparatus 100 includes the legacy service processing unit 340 and can therefore effectively utilize an existing communication infrastructure and also easily migrate to a new communication infrastructure in the future.

Also, in this embodiment, the execution and starting of services occur from the M2M application middle layer platform apparatus 100 to the 3G/LTE infrastructure network 30, which can promote the utilization of services provided by the 3G/LTE infrastructure network 30.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, in the embodiment of the present invention described above, the 3G/LTE infrastructure network 30 is cited as the communication network. However, the 3G/LTE infrastructure network 30 is an example and may, for instance, be a mainly wired infrastructure network.

In the embodiment described above, the rule-policy management unit 320 manages the rules or policies for the storage and utilization of the data related to the external applications 51 to 53 which are executed on the external application server 50. Here, similar rules or policies may be applied to the internal applications 41, 42 which are executed on the internal application server 40.

The features of the present embodiment may also be expressed as follows. A first feature of the present invention is summarized as an M2M application middle layer platform apparatus 100 (M2M platform apparatus) for storing data transmitted through a 3G/LTE infrastructure network 30 (communication network) from M2M devices 20A, 20B (M2M devices) configured to perform M2M (inter-machine communication), and providing an environment for executing a service based on the data, the M2M platform apparatus including: an internal data repository 230 and an external data repository 240 (data repositories) configured to store the data transmitted from the M2M devices through the communication network; a data format processing unit 210 (data format processing unit) configured to determine in which format to store the data into the data repositories; a big data analysis proposal unit 220 (data analysis proposal unit) configured to analyze the data stored in the data repositories and, based on the data, propose a content of a service to be executed; a service execution-start unit 360 (service execution unit) configured to request control on the M2M devices or user equipment 25 (communication equipment), each of which is connected through the communication network, based on the content of the service proposed by the data analysis proposal unit; and a rule-policy management unit 320 (rule-policy management unit) configured to cause the data to be stored into the data repositories based on a rule or a policy for handling of the data to be stored into the data repositories.

In the first feature of the present invention, the rule-policy management unit may hold a rule or a policy for handling of data related to an external application that is utilized by an external entity other than an operating entity of the M2M platform apparatus, and cause data that satisfies the rule or the policy to be stored into the data repository.

In the first feature of the present invention, the M2M platform apparatus further may include a big data-value-added information repository function unit 200 (value-added information repository function unit); and an M2M platform management control function unit 300 (M2M platform management control function unit). Here, the value-added information repository function unit may include the data repository, the data format processing unit, and the data analysis proposal unit, and the M2M platform management control function unit may include the service execution unit and the rule-policy management unit.

A second feature of the present invention is summarized as a communication service execution method to be performed in a server apparatus for storing data transmitted through a communication network from an M2M device configured to perform inter-machine communication, and providing an environment for executing a service based on the data, the communication service execution method including the steps of: storing the data transmitted from the M2M device through the communication network into a data repository; determining in which format to store the data into the data repository; analyzing the data stored in the data repository and, based on the data, proposing a content of a service to be executed; requesting control on the M2M device or communication equipment, each of which is connected through the communication network, based on the content of the service proposed; and causing the data to be stored into the data repository based on a rule or a policy for handling of the data to be stored into the data repository.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2013-114490 (filed on May 30, 2013) is incorporated herein by reference in the present specification.

INDUSTRIAL APPLICABILITY

With the features of the present invention, it is possible to provide an M2M platform apparatus and a communication service execution method which, by effectively utilizing data generated by M2M communication, can execute an optimal service based on the data in an appropriate manner as needed.

EXPLANATION OF THE REFERENCE NUMERALS 10 information communication system
20A, 20B M2M device
25 user equipment
30 3G/LTE infrastructure network
40 internal application server
41, 42 internal application
50 external application server
51 to 53 external application
100 M2M application middle layer platform apparatus
110 transport layer interface
120 application layer gate function
200 big data-value-added information repository function unit
210 data format processing unit
220 big data analysis proposal unit
230 internal data repository
240 external data repository
300 M2M platform management control function unit
310 device control unit
320 rule-policy management unit
330 security processing unit
340 legacy service processing unit
350 service billing unit
360 service execution-start unit

The invention claimed is:

1. An M2M platform apparatus for storing data transmitted through a communication network from an M2M device configured to perform inter-machine communication, and providing an environment for executing a service based on the data, the M2M platform apparatus comprising:
   a data repository configured to store the data transmitted from the M2M device through the communication network;
   a data format processing unit configured to determine in which format to store the data into the data repository;
   a data analysis proposal unit configured to analyze the data stored in the data repository and, based on a result of the data analysis, propose a content of a service including a type of service to be executed;
   a service execution unit configured to have control over the M2M device or communication equipment based on the content of the service proposed by the data analysis proposal unit; and
   a rule-policy management unit configured to cause the data to be stored into the data repository based on a rule or a policy for handling of the data to be stored into the data repository,
   wherein each of the M2M device and the communication equipment is connected through the communication network.

2. The M2M platform apparatus according to claim 1, wherein the rule-policy management unit holds a rule or a policy for handling of data related to an external application that is utilized by an external entity other than an operating entity of the M2M platform apparatus, and causes data that satisfies the rule or the policy to be stored into the data repository.

3. The M2M platform apparatus according to claim 1, further comprising:
   a value-added information repository function unit; and
   an M2M platform management control function unit, wherein
   the value-added information repository function unit includes the data repository, the data format processing unit, and the data analysis proposal unit, and
   the M2M platform management control function unit includes the service execution unit and the rule-policy management unit.

4. A communication service execution method to be performed in a server apparatus for storing data transmitted through a communication network from an M2M device configured to perform inter-machine communication, and providing an environment for executing a service based on the data, the communication service execution method comprising the steps of:
   storing the data transmitted from the M2M device through the communication network into a data repository;
   determining in which format to store the data into the data repository;
   analyzing the data stored in the data repository and, based on a result of the data analysis, proposing a content of a service including a type of service to be executed;
   having control over the M2M device or communication equipment based on the content of the service proposed; and
   causing the data to be stored into the data repository based on a rule or a policy for handling of the data to be stored into the data repository,
   wherein each of the M2M device and the communication equipment is connected through the communication network.

* * * * *